May 22, 1962
A. B. COHEN ET AL
3,035,941
PROCESS FOR TREATING POLYESTER FILM
Filed March 15, 1960
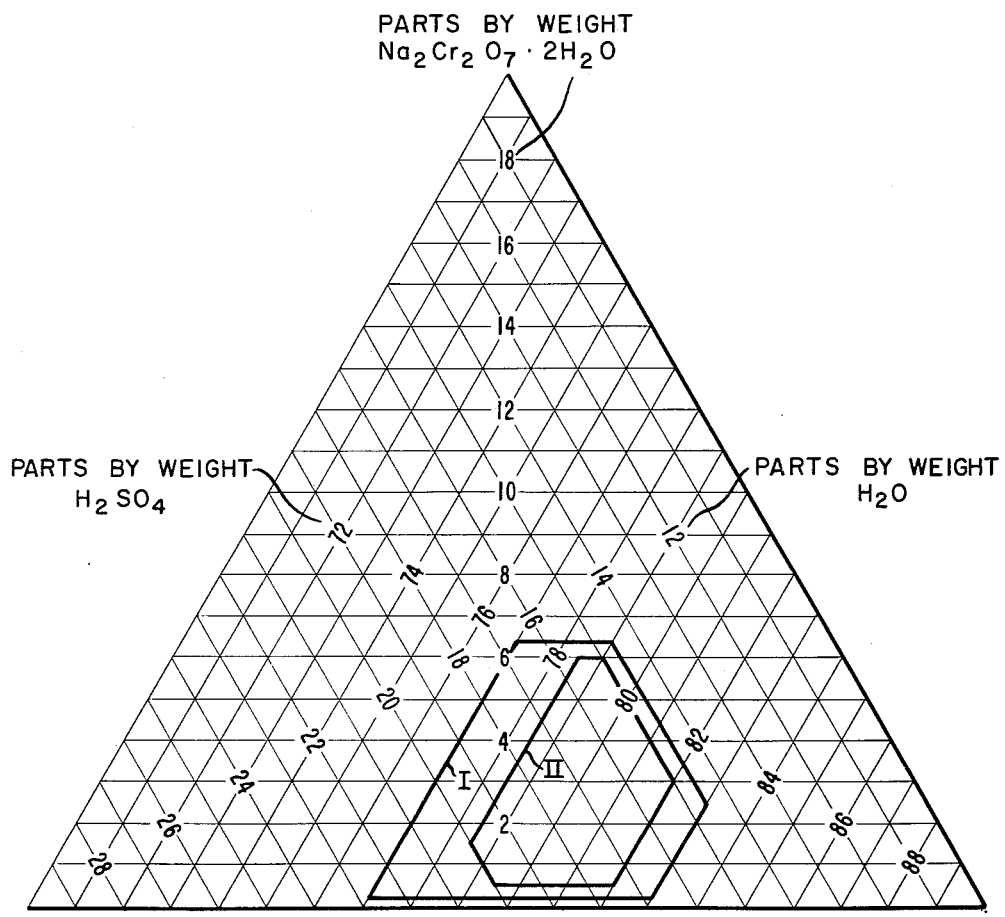
INVENTORS
ABRAHAM BERNARD COHEN
ROBERT BERNARD HEIART
BY Lynn Barratt Morris
ATTORNEY

A. B. COHEN ET AL

United States Patent Office 3,035,941
Patented May 22, 1962

3,035,941
PROCESS FOR TREATING POLYESTER FILM
Abraham Bernard Cohen, Springfield, and Robert Bernard Heiart, Middletown, N.J., assignors to E. I. du Pont de Nemours and Company, Wilmington, Del., a corporation of Delaware
Filed Mar. 15, 1960, Ser. No. 15,093
8 Claims. (Cl. 117—138.8)

This invention relates to a process for treating films. More particularly it relates to a process for treating films to control the adhesion of a coated layer on the film. Still more particularly it relates to a process for treating hydrophobic, highly polymeric films with a solution comprising chromic acid.

In assignee's Cohen and Heiart U.S. application Serial No. 783,313, filed December 29, 1958, there is disclosed a process for imparting hydrophilic properties to the surfaces of highly polymeric polyester films. Cohen and Heiart treat the polyester films with a solution comprising 82 to 98.8 parts by weight of $H_2SO_4$, 1 to 14.5 parts by weight of water, and an amount of chromic acid—yielding compound equivalent to 0.1 to 4.0 parts by weight of $Cr_2O_3$. The treated films are then brought into contact with an excess of water. By the above-described process, films are obtained that have excellent adhesive properties, e.g., light sensitive silver halide emulsions, water-permeable organic colloids having protective colloid properties, etc., strongly adhere to the treated film surface.

An object of the invention is to provide a new process for treating poly(polymethylene) terephthalate and related polymeric films prior to coating so that the adhesion of the coating to the film can be controlled. Another object is to provide such a process whereby the coating adheres to the film base during handling and processing, but when dried after processing, can be removed from the film base. Still another object is to provide a process for preparing a dry-stripping film. A further object is to provide treated poly(polymethylene) terephthalate and related polymeric films having a coating of a water-permeable colloid layer and/or a photosensitive image-yielding layer, said coating being capable of being dry-stripped after processing of the film. Still further objects will be apparent from the description below.

According to the present invention there is provided a process for imparting dry-stripping properties to at least one surface of a hydrophobic film essentially composed of a macromolecular polyester corresponding to the reaction product of (1) at least one dihydric alcohol of the formula $HOCH_2-W_n-CH_2OH$ where W is a divalent hydrocarbon radical taken from the group consisting of methylene, unsubstituted and alkyl-substituted polymethylene radicals of 1 to 8 carbon atoms and a cycloalkylene radical of 5 to 6 carbon atoms, and $n$ is one of the cardinal numbers of 0 and 1, and (2) at least one aromatic dicarboxylic acid of which at least 15 mole percent is terephthalic acid and up to 20 mole percent can be at least one aliphatic dicarboxylic acid, characterized by treating said surface ($a$) by contacting it with a solution comprising 77.0 to 83.0 parts by weight of $H_2SO_4$, 14.6 to 22.8 parts water and an amount of chromic acid-yielding compound equivalent to 0.1 to 3.25 parts by weight of $Cr_2O_3$ for a period up to 60 seconds, and ($b$) by contacting the surfaces of the treated film with an excess of water.

The film resulting from the process can then be coated before or after drying with an aqueous solution of a water permeable organic colloid having protective colloid properties which may contain light-sensitive photographic material or other ingredients. An aqueous, gelatino-silver halide emulsion can be coated directly on a surface of the acid-treated polyester film. The treated, coated films can be exposed through a process transparency, processed, and while wet, can be placed emulsion side down on a surface, e.g., paper, mesh screen, etc., and allowed to dry. The film base can then be easily separated or stripped from the emulsion layer.

The surface or surfaces of the polyester film, e.g., polyethylene terephthalate film, are brought into contact with the treatment solution for a period sufficient to confer the desired adhesive properties. The length of time will, of course, vary with the particular polymeric film, the composition of the acid treatment solution, the temperature of said solution and the manner in which the polymeric film is brought into contact with the acid treatment solution. In general, where the film is brought into contact with, immersed in, or passed through the treatment solution, each square inch of the film should be in contact with said solution for about 0.01 second up to about 60 seconds and preferably from 1 to 15 seconds. The temperature of the treatment solution can range from 0 to about 60° C. or more, preferably 5 to 30° C.

By treating the polymeric, polyester films with the following solution, films with the desired adhesive properties will be obtained:

77.0 to 83.0 parts by weight of $H_2SO_4$, 14.6 to 22.8 parts by weight of $H_2O$ and an amount of a chromic acid-yielding compound equivalent to 0.1 to 3.25 parts of $Cr_2O_3$.

A preferred solution range is as follows:

78.5 to 82.0 parts by weight of $H_2SO_4$, 15.0 to 20.0 parts by weight of $H_2O$ and an amount of a chromic acid yielding compound equivalent to 0.25 to 3.0 parts by weight of $Cr_2O_3$.

In the attached drawing (a triangular coordinate graph) which constitutse a part of this application: Pentagonal area I encompasses the broad range of concentration for the three constituents of a preferred treatment solution. Hexagonal area II encompasses a preferred range of concentration for the three constituents of a preferred treatment solution. The parts by weight for the two areas are as follows:

(I) 77.0 to 83.0 parts by weight of $H_2SO_4$, 14.6 to 22.8 parts by weight of water and 0.2 to 6.5 parts by weight of $Na_2Cr_2O_7.2H_2O$.

(II) 78.5 to 82.0 parts by weight $H_2SO_4$, 15 to 20 parts by weight of water and 0.5 to 6.0 parts by weight of $Na_2Cr_2O_7.2H_2O$.

After the acid-treated films are washed they can be coated, before or after drying, with an aqueous solution or dispersion of a water-permeable organic colloid having protective colloid properties or with other light sensitive coating layers. The water-permeable colloid solution or dispersion may be free from or may contain light-sensitive silver halide grains.

After coating, the films can be handled, exposed and processed in the manner known to the art for the particular coating used. The films can then be placed emulsion side down in intimate contact with a separate surface which permits the wet film surface to dry, e.g., paper, a mesh screen, etc., and are dried. The film base is easily removed or stripped from the separate surface leaving the coating adhering to the separate surface.

This invention will be further illustrated by, but is not intended to be limited to the following examples:

*Example I*

Two sheets of polyethylene terephthalate film, 4 mils in thickness, having a melting point of about 250° C. and cast, stretched, heat-set and heat-relaxed as described in Alles U.S. 2,779,684 were immersed for 5 and 15 seconds respectively in a cold (5° C.) acid solution consisting of 73.4 g. of conc. $H_2SO_4$ (96.0% acid), 4.0 g. of $$Na_2Cr_2O_7 \cdot 2H_2O$$

and 10 ml. of water. Immediately after the acid treatment, the films were washed in cold running water for 1 minute and dried. The resultant film sheets were colorless and transparent. The treated films were coated under safe light conditions with an orthochromatically-sensitized gelatin chlorobromide emulsion contianing 25 mole percent of silver chloride. The coating weight of the resulting emulsion layer was about 62 mg. of silver halide per square decimeter which gave a dry layer thickness of about 0.6 mil. The coated films had acceptable adhesion between the emulsion layer and the base. The emulsion, however, was carefully lifted from the base at a corner of the films, and the entire coating of both the treated films was pulled from the polyethylene terephthalate base.

*Example II*

Example I was repeated except that the acid treatment reagent consisted of 83.3 g. of conc. $H_2SO_4$ (94.9%), 2.0 g. of $Na_2Cr_2O_7 \cdot 2H_2O$ and 14.7 ml. of $H_2O$. The dry, coated, chromic acid treated film was exposed to room light and the film was processed by:

(1) Immersion for 60 seconds at 73° F. in the following solution:

| | |
|---|---|
| Methyl-p-aminophenol | g-- 3.8 |
| Sodium metabisulfite | g-- 38.0 |
| Sodium sulfite, anhydrous | g-- 7.6 |
| Hydroquinone | g-- 38.0 |
| Water to make 1.0 gallon. | |

(2) Immersion for 15 seconds at 73° F. in the following solution:

| | |
|---|---|
| $Na_2CO_3 \cdot H_2O$ | g-- 300 |
| Water to make 3.0 liters. | |

(3) Immersion for 15 seconds at 73° F. in the following solution:

| | |
|---|---|
| Glacial acetic acid | ml-- 150 |
| Water to make 3 liters. | |

The processed film was transferred to a water bath at 115° F. for 2 minutes. The film was then removed from the water bath and pressed onto nainsook, the emulsion side against the cloth. The excess water was blotted off and the composite allowed to dry. The nainsook cloth was removed from the film by stripping. The emulsion cleanly stripped from the film base and adhered to the cloth.

A control strip of untreated polyethylene terephthalate film was coated as described in Example I with the orthochromatically-sensitized gelatin layer described in that example. Upon drying and slight flexing, the large areas of the emulsion layer broke away from its film base, small areas of emulsion remained attached to the film.

*Example III*

The procedure of Example II was repeated except that the chromic acid treatment solution consisted of 85.4 g. of conc. $H_2SO_4$ (94.9%), 1.0 g. of $Na_2Cr_2O_7 \cdot 2H_2O$ and 13.6 g. of water. After processing and washing and while still wet, the film strips were pressed onto a fine silk mesh, as described in Example II. The composite was allowed to dry, and the silk cloth was stripped from the films. The emulsion layer adhered to the cloth, cleanly stripping from the film base.

*Example IV*

A sheet of film base as described in Example I was treated for 10 seconds in a treatment bath consisting of 84.3 g. of conc. $H_2SO_4$ (94.9%), 3.0 g. of $$Na_2Cr_2O_7 \cdot 2H_2O$$

and 12.7 ml. of $H_2O$ and was washed in cold running water for 30 seconds. The resultant treated film was transparent and colorless. The film was coated with the orthochromatically-sensitized gelatin chlorobromide emulsion described in Example I, and after drying, was exposed through a transparency bearing a graphic two-tone line image. The film was then processed as described in Example II and was washed under running water at 100 to 120° F. for 2 minutes. The water wash dissolved and washed away the unexposed, unhardened areas of the emulsion leaving the exposed and hardened areas intact. The film was then firmly pressed, emulsion side down, onto a silk printing screen supported tautly on a wooden frame. Excess water was blotted off and the composite was allowed to dry. The base material was then easily peeled from the screen, leaving a negative-relief image of the original transparency firmly attached to the screen. The screen was used for printing, and excellent reproductions of the original transparency were obtained.

*Example V*

Example IV was repeated except that after the unexposed, unhardened emulsion areas were washed away the film was placed, emulsion side down, on a piece of absorbent, bond paper, and a roller was used to press the film firmly against the paper. The assembly formed was allowed to dry, and the film base was stripped from the paper leaving a black relief image firmly adhered to the paper.

*Example VI*

A stripping film was prepared and dried as described in Example I. The film was exposed through a transparency bearing a series of contour lines representing map elevations. The exposed film was then developed as described in Example IV and was washed for 2 minutes under vigorously running water at 110 to 120° F. The unexposed, unhardened emulsion in the contour lines was removed in the wash leaving an opaque relief image of the solid areas within the contour lines, and the wet film was dried. A color separation transparency was prepared as follows: a transparency of the original contour lines was mounted on a table, emulsion side up, and the emulsion was moistened. The opaques corresponding to the areas to be printed in a single color were carefully stripped from the stripping film and placed in their appropriate places on the transparency. The opaques were allowed to dry and adhered to the transparency. The buildup composite thus formed was used as the color separation transparency for the chosen color for making printing plates and screens as is known in the art.

Results comparable to the examples can be obtained with equivalent amounts of K, Li, Rb and Cs chromates and dichromates.

An oxidizer, $Cr^{+6}$, is required for the desired results. Hexavalent chromium occurs in chromium trioxide and chromates and dichromates. Since chromic acid ($H_2CrO_4$) is the active component, satisfactory results can be obtained with these and other chromic acid-yielding compounds (forming $H_2CrO_4$ in the presence of $H_2SO_4$ and water) to give, within solubility limits, an equivalent amount of $H_2CrO_4$ in the treatment solution.

The invention is, of course, not limited to the treatment of the surfaces of the particular polyester of the foregoing examples. Similar results can be obtained by treating films composed of any of the high-melting, difficultly soluble, usually microcrystalline, cold-drawing linear, highly polymerized esters of terephthalic acid and glycols of the series $HO(CH_2)_nOH$, where $n$ is an integer within the range of 2 to 10, described in Winfield et al. Patent 2,465,319. Other useful polyester films which can be treated include those prepared from highly polymerized esters of terephthalic acid and at least one glycol of the formula $HOCH_2—W—CH_2OH$ where W is polymethylene or alkyl-substituted polymethylene of 0 to 8 carbons, e.g., 2,2-dimethylpropylene-1,3 or a cycloalkylene radical of 5 to 6 carbon atoms, e.g., cyclopentyl-1,3, and cyclohexyl-1,4. In addition, copolyester films prepared comprising up to 85 mole percent isophthalic acid and 15% or more of terephthalic acid components such as are disclosed in British patent specification 766,290 can be used. Films comprising up to 20 mole percent of aliphatic dicarboxylic acids based on total moles of acid, e.g., succinic, glutaric, adipic, hexahydroterephthalic and sebacic acids, in addition to at least 15 mole percent terephthalic acid are also useful. The above-described polymers may contain a number (e.g., 1 to 12 or more) of ether groups in the polymer chain. Such ether groups may be added as part of ether containing glycol derivatives or formed by side reactions during polymerization.

The acid treated film should be quenched immediately because the effect of the strong acid will continue until the reagent is either consumed or diluted and removed, e.g., washed off the film surface. While it is preferred that cold water, e.g., 10 to 15° C. be used, warmer water, e.g., at room temperature (25° C.) or higher can be used.

The present invention is useful for treating highly polymeric polyester films, as described above, to control the adhesion of a coating on the surface or surfaces of said film. The coated, treated films are useful for the preparation of screen printing elements (e.g., on fabrics of natural and synthetic fibers) composite maps, adhering images onto porous or water-permeable surfaces, making phototemplates on metal or plastic surfaces, etc.

The invention is useful for controlling the degree of adherence of various water-permeable colloid layers to the treated polyester film base. Among the water-permeable colloids which can be coated from aqueous solution to form thin dry-strippable layers are those of both natural and synthetic type including gelatin, albumin, agar-agar; polyvinyl alcohol, polyvinyl acetals with p-hydroxybenzaldehyde sodium o- and p-sulfobenzaldehyde polyvinyl acetal containing sufficient unsubstituted vinyl alcohol (—$CH_2CHOH$—) units to confer water-permeable characteristics; mixtures of gelatin with various latices; e.g., those in Potter et al. U.S. Patent 2,376,005 or polyvinyl pyrrolidone, dextran or dextrine.

An advantage of the invention is that it provides new and improved poly(polymethylene) terephthalate and related polymeric film bases. Another advantage is that it provides a simple, quick, dependable and economic process for controlling the adhesion of a treated film to a coating layer, e.g., layers containing light-sensitive, silver halide emulsion, water-permeable organic colloids having protective colloid properties, etc. A further advantage is that the invention provides a practical and dependable process for modifying the surfaces of the polyester films described above, and particularly biaxially oriented films, so that the degree of adherence to a water permeable colloid layer can be controlled so that the layer can be dry-stripped.

What is claimed:

1. A process for imparting dry-stripping properties to at least one surface of a hydrophobic film essentially composed of a macromolecular polyester prepared by reacting (1) at least one dihydric alcohol of the formula $HOCH_2W_n$—$CH_2OH$ where W is a divalent hydrocarbon radical selected from the group consisting of methylene, unsubstituted and alkyl-substituted polymethylene radicals of 1 to 8 carbon atoms and a cycloalkylene radical of 5 to 6 carbon atoms, and $n$ is one of the cardinal numbers 0 and 1 with (2) at least one compound selected from the group consisting of an aromatic dicarboxylic acid and an ester-forming derivative of said dicarboxylic acid of which at least 15 mole percent is selected from the group consisting of terephthalic acid and an ester-forming derivative of terephthalic acid and up to 20 mole percent can be selected from the group consisting of at least one aliphatic dicarboxylic acid and an ester-forming derivative of said acid, characterized by treating said surface (a) by contacting it with a solution comprising 77.0 to 83.0 parts by weight of $H_2SO_4$, 14.6 to 22.8 parts by weight of water and an amount of a chromic acid-yielding compound equivalent to 0.1 to 3.25 parts by weight of $Cr_2O_3$, said compound yielding chromic acid in water containing sulfuric acid, for a period up to 60 seconds and (b) by contacting the treated surface of the film with an excess of water.

2. A process as defined in claim 1 wherein said polyester film is biaxially oriented.

3. A process as defined in claim 1 wherein the temperature of the solution is between 0° C. and 60° C.

4. A process as defined in claim 1 wherein the temperature of the solution is between 5° C. and 30° C.

5. A process as defined in claim 1 wherein said polyester is a poly(polymethylene) terephthalate containing 2–10 methylene groups.

6. A process as defined in claim 1 wherein said chromic acid-yielding compound is an alkali metal dichromate.

7. A process as defined in claim 1 wherein said chromic acid-yielding compound is sodium dichromate.

8. A process as defined in claim 1 wherein said chromic acid yielding compound is $Na_2Cr_2O_7 \cdot 2H_2O$.

References Cited in the file of this patent

UNITED STATES PATENTS 2,668,134    Horton _____ Feb. 2, 1954

FOREIGN PATENTS 683,218    Great Britain _____ Nov. 26, 1952